United States Patent
Nørager

(10) Patent No.: US 8,125,444 B2
(45) Date of Patent: Feb. 28, 2012

(54) UNIT, AN ASSEMBLY AND A METHOD FOR CONTROLLING IN A DYNAMIC EGOCENTRIC INTERACTIVE SPACE

(75) Inventor: Rune Nørager, Arhus N (DK)

(73) Assignee: Bang and Olufsen A/S, Struer (DK)

( * ) Notice: Subject to any disclaimer, the term of this patent is extended or adjusted under 35 U.S.C. 154(b) by 695 days.

(21) Appl. No.: 11/922,392

(22) PCT Filed: Jun. 30, 2006

(86) PCT No.: PCT/DK2006/000389
§ 371 (c)(1),
(2), (4) Date: May 21, 2008

(87) PCT Pub. No.: WO2007/003195
PCT Pub. Date: Jan. 11, 2007

(65) Prior Publication Data
US 2009/0033618 A1    Feb. 5, 2009

(30) Foreign Application Priority Data
Jul. 4, 2005  (DK) .................................. 2005 00983

(51) Int. Cl.
G06F 3/033    (2006.01)
G09G 5/08     (2006.01)

(52) U.S. Cl. .................... 345/157; 345/156; 715/856
(58) Field of Classification Search .......... 345/156–184; 715/730, 732, 856, 864
See application file for complete search history.

(56) References Cited

U.S. PATENT DOCUMENTS

| | | | |
|---|---|---|---|
| 4,434,419 A * | 2/1984 | Couper et al. | 345/2.2 |
| 6,084,556 A * | 7/2000 | Zwern | 345/8 |
| 6,498,628 B2 * | 12/2002 | Iwamura | 348/734 |
| 6,501,515 B1 * | 12/2002 | Iwamura | 348/734 |
| 2002/0024506 A1 * | 2/2002 | Flack et al. | 345/169 |
| 2004/0022416 A1 * | 2/2004 | Lemelson et al. | 382/104 |
| 2004/0246229 A1 * | 12/2004 | Yamada | 345/156 |
| 2005/0162384 A1 * | 7/2005 | Yokoyama | 345/156 |
| 2005/0212749 A1 * | 9/2005 | Marvit et al. | 345/156 |
| 2005/0212750 A1 * | 9/2005 | Marvit et al. | 345/156 |
| 2005/0212751 A1 * | 9/2005 | Marvit et al. | 345/156 |
| 2005/0212752 A1 * | 9/2005 | Marvit et al. | 345/156 |
| 2005/0212753 A1 * | 9/2005 | Marvit et al. | 345/156 |
| 2005/0212754 A1 * | 9/2005 | Marvit et al. | 345/156 |
| 2005/0212755 A1 * | 9/2005 | Marvit | 345/156 |
| 2005/0212756 A1 * | 9/2005 | Marvit et al. | 345/156 |
| 2005/0212757 A1 * | 9/2005 | Marvit et al. | 345/156 |
| 2005/0212758 A1 * | 9/2005 | Marvit et al. | 345/156 |

(Continued)

FOREIGN PATENT DOCUMENTS
DE          103 13 019 A1    10/2004

*Primary Examiner* — Amare Mengistu
*Assistant Examiner* — Dmitriy Bolotin
(74) *Attorney, Agent, or Firm* — Harness, Dickey & Pierce, PLC

(57) ABSTRACT

A portable unit for providing instructions for navigation in menus or controlling equipment, the unit having a user interface and a camera pointing in the general direction of the user. The unit tracking relative movements between the unit and the user and converting the relative movement into the instructions. The unit may be used as a remote control for audio or video equipment or computers or the like.

9 Claims, 7 Drawing Sheets

U.S. PATENT DOCUMENTS

| | | | |
|---|---|---|---|
| 2005/0212759 A1* | 9/2005 | Marvit et al. | 345/156 |
| 2005/0212760 A1* | 9/2005 | Marvit et al. | 345/156 |
| 2005/0212766 A1* | 9/2005 | Reinhardt et al. | 345/157 |
| 2005/0212767 A1* | 9/2005 | Marvit et al. | 345/158 |
| 2006/0164382 A1* | 7/2006 | Kulas et al. | 345/156 |
| 2009/0033618 A1* | 2/2009 | Norager | 345/156 |

* cited by examiner a)

b)

c)

d)

UNIT, AN ASSEMBLY AND A METHOD FOR CONTROLLING IN A DYNAMIC EGOCENTRIC INTERACTIVE SPACE

The present invention relates to a novel manner of controlling units, such as navigating in images/text or displaying images/text or elements, or controlling audio/video equipment, using a handheld unit.

As an alternative to button, mouse and pen interaction techniques for manipulating a device, miscellaneous methods have been investigated with reference to terms such as tangible computing and rich interaction.

One such area has been to translate a user motor action—handling of the device—into interaction input. Accelerometers and gravimeters have been employed to translate movement and orientation parameters of the device into interaction commands.

Other techniques have employed; the camera found in many mobile phone devices may be used to track changes in the optical flow relative to a fixed point, and translate these into interaction input. Camera based solutions are superior to gravimetric and accelerometer based solutions in that they can extract more information about movement from the optical flow. Implementation is also easier. The disadvantage of these camera based solutions has typically been that they limit the user's freedom of movement in macro space since the camera is locked on to a feature in the environment that is stationary.

Thus, interaction via movement can not be maintained while moving around with the device. The challenge is to incorporate the freedom of movement from the accelerometer and gravimetric solutions and combine them with the information advantages of the camera based solutions.

In a first aspect, the present invention relates to a portable unit for providing information, the unit comprising:

- a user interface for receiving information from or providing information to a user, the user interface being provided in or at a surface of the unit,
- an image providing element adapted to provide an image, the image providing element being directed so as to image at least a direction being perpendicular the surface and away from the user interface,
- means for determining or estimating, on the basis of the image(s) of the image providing element, a relative movement between the unit and one or more items imaged by the image providing element and for providing the information on the basis of the determined or estimated relative movement.

In the present context, a portable unit is a unit which may be carried by a person, such as a handheld unit. The present unit may be a PDA, a mobile telephone, a laptop computer, a camera, a remote control for controlling larger or stationary objects, such as TV's, stereos or the like.

The image providing element is adapted to provide an image comprising the perpendicular direction in order for it to be able to image or monitor something or somebody interacting with or viewing the user interface. Preferably, the image providing means are provided in the vicinity of the user interface in order to have as large an overlap as possible of the space in front of the user interface and the field of view of the image providing means.

Naturally, the user interface need not be provided in a plane surface, whereby the image providing means preferably is positioned so as to be able to monitor or image interaction with as many parts or as important parts of the user interface as possible.

The tracking of the relative movement may be in relation to any items viewed by the image providing element (normally a camera). In a particular situation, the tracking is performed on the basis of the user's head or another body part of the user. In that situation, it may be desired to provide face recognition or the like, in order to track only on a particular user.

Naturally, more items may be available for tracking the relative movements, and it may be desired to be able to select one or more of such items in order to determine the relative movement. This is particularly relevant when these items move in relation to each other.

The present determination of the relative movement is preferably performed on the basis of a scanning using consecutive images. Thus, a change in an angle may be seen from displacement/rotation of items of one image from those of the next. A change in distance may be seen from a difference in size of imaged items.

In one embodiment, the user interface comprises a display or monitor for providing information to the user. In this situation, the image providing means is preferably directed so that at least a major part of angles and directions, from which the information provided by the display/monitor may be discerned, are imaged by the image providing means. In this manner, it is ensured that a person viewing the monitor/display will also be imaged by the image providing means. Thus, the image providing means will then usually have one or more items, such as the person, to use in order to determine the relative movement.

Also, in this embodiment, the determining/estimating means are preferably adapted to control the display/monitor on the basis of the provided information.

One manner of providing this control is one in which the unit further comprises means for holding information relating to a two or three-dimensional element or image, which may be a picture, text, an image of a three-dimensional object or the like, to be displayed on the display or monitor, the determining means being adapted to determine or estimate, on the basis of the determined or estimated relative movement, a change in angle, direction, and/or position from viewing the element or image via the display/monitor.

These holding means would normally be a storage for holding information, such as a RAM, ROM, PROM, EPROM, EEPROM, SD-memory card, portable memory units, hard disc, CD-ROM, DVD, tape storage or the like.

The viewing or monitoring of the element may be performed in a number of manners. In one manner, only part of the element may be seen, whereby navigation is required in order to see all of or other parts of the element. The other parts of the element may be other parts of a text or an image, or another side of a sheet/plane or a three-dimensional object. Also, enlargement or the opposite may be desired or required in order to better discern details or in order to better navigate to the desired position, part, angle, direction or the like.

In addition to the image forming means, the unit may further comprise one or more of: a gyro unit, a microphone, an accelerometer, a button, and a distance determining unit, and wherein the determining or estimating means is adapted to determine or estimate the information on the basis also of information received from one or more of the gyro unit, the microphone, the accelerometer, the button, and distance determining unit. Thus, the user may also speak to the unit, shake it, push buttons or position the unit at a certain distance (or move it a certain distance), and have the unit (or other unit) controlled in that manner.

Preferably, the unit the image providing element is positioned at, on or in the surface. In this manner, a fixing or attachment to the surface will ensure that the image providing means are adapted to provide images of items for use in the determination of the relative movement.

In one embodiment, the unit further comprises a user-operatable button having two modes: a first mode in which the determining or estimating means provide the information on the basis of the determined or relative movement, and a second mode in which the determining or estimating means do not provide the information on the basis of the determined or relative movement. Thus, the button may be used for controlling the operation of the estimating/determining means.

Sometimes, the relative movement desired is not possible due to physical limits to the movement (small spaces, arms no long enough or the like). In this situation, the button may be operated while performing a first relative movement to a position from which the desired relative movement is possible; but at the same time have the estimating/determining means not take this first relative movement into account. Subsequently, the button is put into the other mode and the desired relative movement may be performed.

A second aspect of the invention relates to an assembly of a controllable apparatus and the above-mentioned unit, the unit being adapted to transmit the provided information, and the apparatus being adapted to receive the information and act in accordance with the information.

Thus, the unit may be used for controlling information provided by the apparatus, which may be a computer, a TV, a stereo or any other type of controllable apparatus. Thus, the present portable unit may be a remote control. Naturally, the information transmitted from the portable unit to the other unit may be transported in any suitable manner, such as via a wireless connection (typically blue tooth, infrared, or radio, or the like) or via a wire connection (via an optical link or an electrical cable) and using any suitable protocol.

The apparatus may act in any suitable manner. If the apparatus is a stereo, the sound (volume or the like) may be controlled in accordance with the information received and thus in accordance with the relative movement determined or estimated. A simple example is that the detection of a relative rotation in one direction may turn up the volume and a relative rotation in the other direction will turn the volume down.

In a particular embodiment, the apparatus is adapted to provide the user with visual information, via a display or monitor, or audio, the apparatus being adapted to alter the visual information or the audio in accordance with information received from the unit. In this situation, all the above comments as to the controlling of visual information may be provided in the apparatus in addition to or instead of on a display/monitor of the unit.

In another aspect, the invention relates to a method of operating the above unit or the above apparatus, the method comprising:
  providing, on the monitor or display, an image of an image or an element, the element being displayed or monitored from a first direction, at a first angle and/or at a first distance,
  determining or estimating a relative movement on the basis of one or more images from the image providing element,
  determining or estimating, on the basis of the relative movement, and maybe also the first direction/angle/distance, a second direction, angle and/or distance from which to view or monitor the element, and
  controlling the monitor or display to view or monitor the element from the second direction/angle/distance.

As mentioned above, the image or element may be anything displayable on a display/monitor, such as an image, text, a three-dimensional element, or the like.

Preferably, a difference between the first and second direction/angle/distance is correlated to a difference in direction/angle/distance between the portable unit and the imaged item(s). However, due to the fact that the user may not wish to have to perform too large relative movements in order to view the whole element/image, it may be desired to have this correlation "geared", so that a little displacement may provide a larger displacement on the display/monitor. Also, a varying displacement/rotation may be achieved depending on the relative displacement/rotation determined/estimated such that a small relative displacement/rotation may bring about only a small displacement/rotation on the display/monitor, but a larger relative movement may bring about a much larger movement on the display/monitor.

Also, the velocity of the relative movement may be used for interpreting what the user wishes performed. Thus, while a slow rotation may bring about a translation or the like of an image (scroll over a page with text, e.g.), a fast rotation may bring about the illustration/display of another image, another page of a book or the like.

An intuitively simple manner of implementing one embodiment is to imagine viewing the element or image trough the display/monitor which then functions as a type of window. Thus, the display/monitor may be controlled by the relative movement—or the image/element viewed may.

Thus, the providing step may comprise displaying or monitoring only part of the image or element on the display or monitor, and where the controlling step comprises displaying or monitoring a larger or a smaller part of the image/element, if the step of determining or estimating the relative movement determines or estimates a relative movement toward or away from the imaged item(s). Thus, a movement toward the user (smaller distance) may be interpreted as that the window is brought closer to the user, whereby more of the image may be seen. Alternatively the same movement may be interpreted as that of the use of a magnifying glass, whereby a smaller part of the image is seen and magnified.

In another situation, or in addition to the above situation, the providing step may comprise displaying or monitoring only a first part of the image or element on the display or monitor, the image/element having a right and a left direction as well as a first direction at an angle thereto, and where the controlling step comprises displaying or monitoring a part of the image/element positioned to the right or to the left of the first part, if the step of determining or estimating the relative movement determines or estimates a relative rotation, relative to the imaged item(s), around the first direction. Normally, the left and right direction will be those normally to the left and right of the element/image when properly viewed by a viewer. Many elements, such as text, images, pictures and the like, have a natural direction of up and down, and most of them also right and left. Thus, a relative movement to the left may bring about the viewing of a part of the image positioned more to the left than the initially imaged part.

Alternatively or in addition, the providing step may comprise displaying or monitoring only a first part of the image or element on the display or monitor, the image/element having an up and a down direction as well as a second direction at an angle thereto, and where the controlling step comprises displaying or monitoring a part of the image/element positioned further up or further down of the first part, if the step of determining or estimating the relative movement determines or estimates a relative rotation, relative to the imaged item(s), around the second direction. In this manner, e.g. scrolling of text is possible.

In the following, preferred embodiments of the invention will be described in relation to the drawing, wherein:

FIG. 1 gives an example of the remote control device according to one embodiment of the invention, and illustrates the control device's main components: the display screen, the buttons, the camera, the image detection and the microphone.

Figure 1:
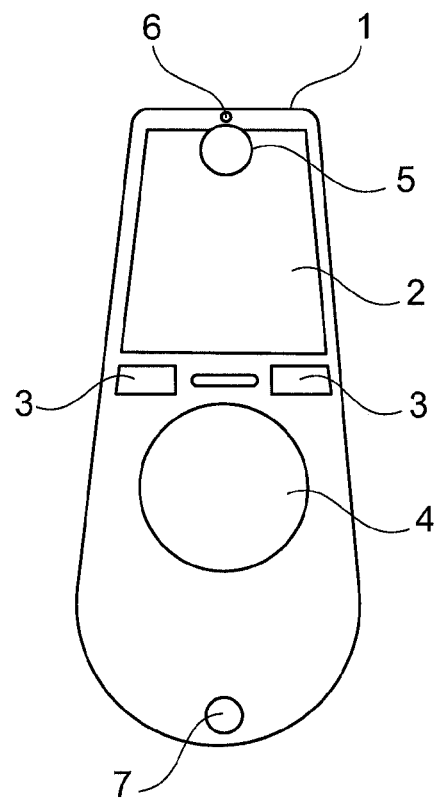

According to a preferred embodiment of the present invention a wireless remote input device/unit (1) is provided, where the device might be equipped with a graphical display (2), buttons for function selection (3), and detecting user given rotational activation (4), sub-systems to feature optical information like a camera (5) and image pattern scanning e.g. a laser unit (6).

According to the present embodiment, the camera (5) is mounted on the front of the remote device (1). By having the camera mounted on the front side of the device, and tracking changes in the optical flow of the user's face (12):

A movement can be achieved by moving the device (1) relative to the head (12).

A movement can be achieved by moving the head (12) relative to the device (1).

A movement can be achieved as a combination of moving the head (12) and device (1) relative to each other.

The algorithm that tracks the changes in the optical flow can be optimised to lock on the specific features of the user's face, i.e. eyes, nose, mouth and any combination of these. The algorithm can also be optimised to other features as described and published in face recognition research projects.

According to the present embodiment, the device features a coupling button (3) to establish and maintain the link between the physical world and the virtual application. The button has two modes of functioning:

1. Mode one maintains the link only when the button is depressed, i.e. the device can be moved around without movement to be caused in the application when the button is not depressed.
2. Mode two maintains the link when the button is not depressed. In order to move the device without any movement to be caused in the application, the button has to be depressed.

The two modes are reciprocal to each other.

The coupling between the movement of the device relative to the physical world and translated input into the application in the device can either be one-to-one or geared:

1. One-to-one: One centimeter movement of the device equals a one centimeter movement in the application.
2. One centimeter movement of the device equals more or less than one centimeter movement in the application.

From a user's point of view, the input device as described above supports very advanced man-machine-operations. Thus, navigation through a menu presented on the device under control (65) may be accomplished very easily and depending on the user-given input. This includes user-given commands entered via the buttons (3) located on the remote terminal, moving and/or tilting the remote terminal (1) and/or head movements performed by the user (10).

According to the detected user requests, the remote terminal issues commands to the equipment under control (60), and the related action is executed e.g. to browse down into the menu hierarchy (70), and consequently the view is replicated to the remote terminal (1) as part of the synchronization with the device under control.

The communication link (96) between the input device and the electronic equipment (60) which is to be controlled may be provided in any known manner such as for example infrared, ultra sound, radio signals, Blue Tooth technology or any other well-known method.

As part of the media synchronization the user might command, from the remote input device, that an actual sub-view and menu hierarchy (70) displayed on the equipment being controlled to be the actual focal point for further navigation commands issued from the remote terminal, either by specific command (3) and/or given by user gestures.

In a further advantageous embodiment, an accelerometer unit (95) is arranged inside the input device, which accelerometer unit will detect relative movements of the entire input device, and also use this detected movement as input for controlling the equipment unit (60). Head movements (10) made by the user and detected by the camera (5) might contribute to the relative movement in the X, Y, Z directions to be communicated to the device under control as a final command (20) to be executed by the unit.

The accelerometer unit (95) will detect any kind of motion of the device such that for example a horizontal movement of the entire device will be detected by this accelerometer unit. Thereby, the electronic circuitry provided inside the input device may be programmed to detect input from the accelerometer unit. Detected movements might be applied directly in terms of codes mapped into a 1:1 correspondence or applied with scaling factors defined in a configuration table (93).

By elevating or lowering the entire device (1), the accelerometer unit is influenced whereby an input is generated. Correspondingly, if the unit has been at rest, for example placed on a table top for a period of time, movement of the input device will be detected by the accelerometer unit, whereby the screen of the input device may be turned on. In this example the accelerometer unit has, therefore, also a built-in power save mode. The accelerometer units input due to movement of the entire device may, as described above, be used as input for any desired input to the electronic devices which a user wishes to control with the input device.

In a further advantageous embodiment, a gyro unit (94) is arranged inside the input device, which gyro unit will detect rotational movements of the entire input device, and use this detected movement as input for controlling the equipment unit (60).

The movements detected by the gyro might be interpreted according to the valid types of input sensing and the related tables (93) and processed accordingly by the remote command terminal. Detected rotational movements might be applied directly in terms of codes mapped into a 1:1 correspondence or applied with scaling factors defined in a configuration table (93) e.g. scaled as a relative rotation within one quadrant.

In a further advantageous embodiment, a vision unit (6) is arranged inside the input device (1), which vision unit can detect image patterns (11) that are visual to the remote terminal. Several different types of images can be processed:
changes in the environmental light, e.g. from night to day, identification of image patterns e.g. like reading a strip code on a label or a strip code from some external screen.

The detected image information is used as input for controlling the remote device and the related equipment under control. The visual information detected might be interpreted according to the valid types of input sensing and the related tables (92) and processed accordingly by the remote command terminal. A commercial available standard system based on laser—or infrared detection can be used.

In a further advantageous embodiment, the built in camera (5) might act as a person identification unit arranged inside the input device, which identification unit can detect the shape of a user (10) applying standard and well known methods to detect individual users.

The person identification information detected might be interpreted according to the valid types of input sensing and the related tables (92) and processed accordingly by the remote command terminal.

In a further advantageous embodiment, a built in microphone act as a voice identification unit (7) arranged inside the input device, which identification unit can detect an oral spoken command of a user (10) applying standard and well known methods to detect voice patterns.

The voice command identification information detected might be interpreted according to the valid types of input sensing and the related tables (91) and processed accordingly by the remote command terminal.

In a further advantageous embodiment, a built in speaker act as a feed back unit (97) arranged inside the input device, which sound feed back unit generates individual tones/signals as acknowledgement to input commands given by a user (10), and/or as a response to detected object (10) movements, and/or as a response to detected remote terminal (1) movements and/or as acoustical feed back on information received from the equipment under control (60).

FIG. 1 gives one example of the remote control device (1) according to one embodiment of the invention. The display screen is a full function graphical screen of any type, e.g. LCD, TFT, CRT, OLED and plasma or alike.

A plurality of buttons (3) is disposed for direct interaction performed by the user and in addition an input device (4) to support a rotational/translational input given by the user. This button device can be implemented as a mechanical wheel, or as a logical wheel in terms of a touch sensitive, i.e. a touch pad input area on the surface of the input device (1).

The means to establish, keep and manage the optical link between the input device (1) and the equipment under control (60) are the camera (5) and/or an image detection unit (6). This device applies detection means based on laser light, alternatively infrared light.

Figure 2:
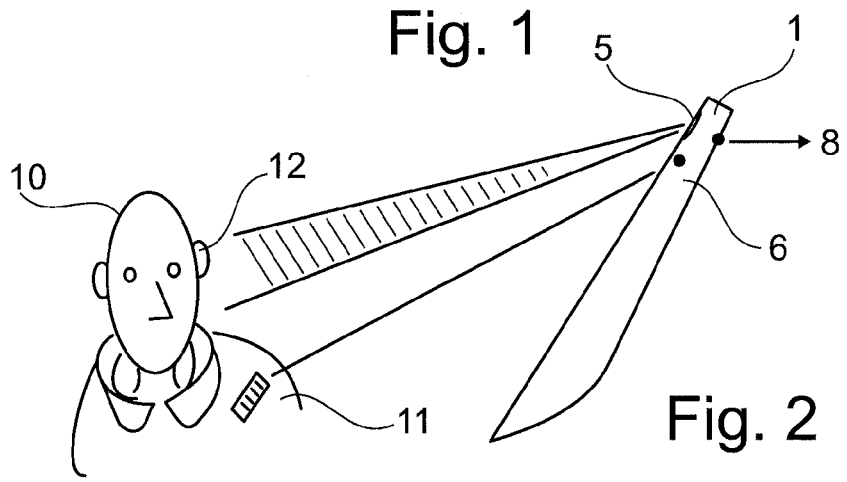
FIG. 2 illustrates the optical flow to/from an object and from/to the remote input device, according to one embodiment of the invention.

FIG. 2 gives one example of the optical focusing means according to one embodiment of the invention. The camera (5) in the input device (1) has focus on the person (10) operating the input device. Dedicated sense/identify features makes it possible to identify specific objects of the person in focus, e.g. the eyes (12), and establish the optical link between the user and the input device.

Movements of either the input device and/or the focused objects of the user make it possible to determine a relative movement that can be transferred to the equipment under control as a specific command code (8).

The image pattern detection system (6) can identify image objects (11), which objects might be applied in the connection of the optical link supplementary to the camera (5) featured above. A plurality of different kinds of objects supports different functions: a) a bar code, where the identification of a legal pattern enables the optical link connection and where the image pattern becomes the focussing fix point; b) a bar code, where the identification of a legal pattern can be used as information to the input device (1) as a command to perform a specific process locally in the device (1) and/or further distribute the command to the equipment under control as a specific command code (8).

Figure 3:
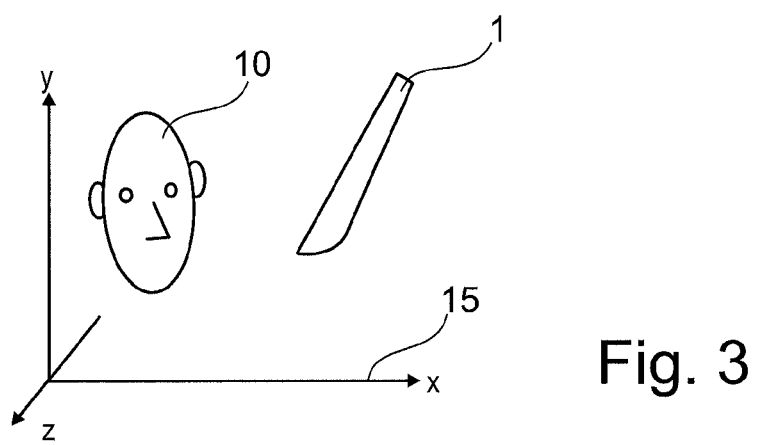
FIGS. 3, 4 and 5 illustrate how an object and the remote input device, determines the relative movement by referring to the same coordinate system.

FIG. 3 gives one example of movement localization means according to one embodiment of the invention. The input device (1) and the object (10) that is the candidate for identification and target for the optical link connections refer to the same 3-dimensional coordinate system (15). By this means, relative movements of each of the objects can be determined and mapped into command codes accordingly.

Figure 4:
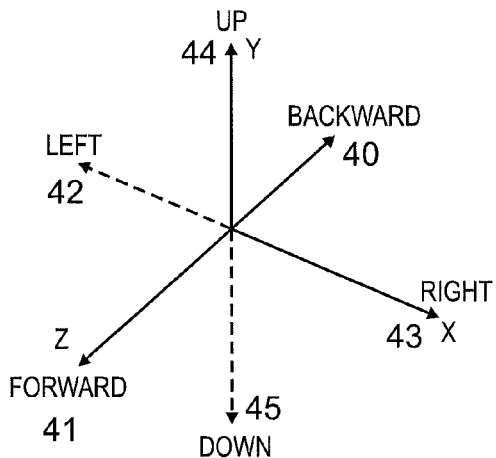

FIG. 4 gives more examples of movement localization means according to one embodiment of the invention. All kind of movements along the X, Y, Z axes are supported like: left (42), right (43), forward (41), backward (40) and tilting.

Figure 5:
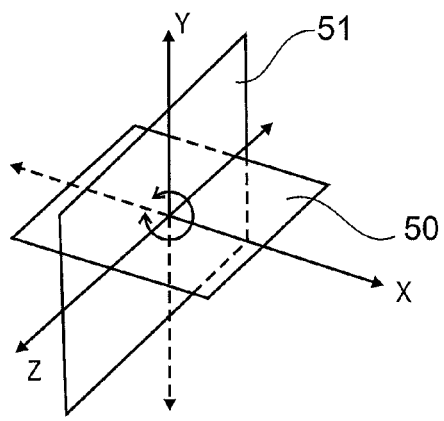

FIG. 5 gives more examples of movement localization means according to one embodiment of the invention. All kind of rotational movements in the 3-dimensional space/plane are supported like and pictured into the horizontal plane (50), and the vertical plane (51), and tilting in multiple directions.

Figure 6:
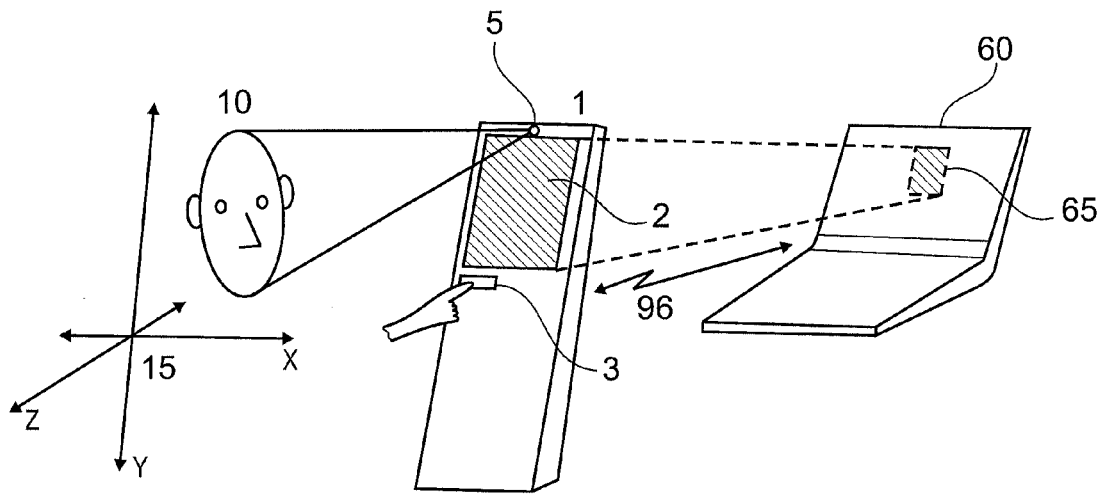
FIG. 6 illustrates the optical flow including an object, the remote input device, and equipment under control, according to one embodiment of the invention.

FIG. 6 gives one example of a camera (5) based optical link connection from the remote control device (1) to the user object (10) according to one embodiment of the invention. The optical link connection includes the remote wireless connection (96) to the equipment under control (60). During operation, the remote terminal display (2) is a mirror of the active information displayed on the device under control (65). This displayed information is presented on the remote device partly or fully according to the size of the source (60), and the size of the destination unit (1) display.

The input device (1) can manually be controlled by the user by activating the relevant buttons (3). These commands can be specific commands that are transferred to the equipment under control, and/or commands to enable/disable the mode coupling as previously described.

The input device (1) and the user object (10) refer to the same coordinate system (15), thus all combinations of the relative movement of the input device (1), the object (10) or both (1,10) can be calculated and converted into the specific command to be issued from the terminal (96) to the remote equipment (60).

Figure 7:
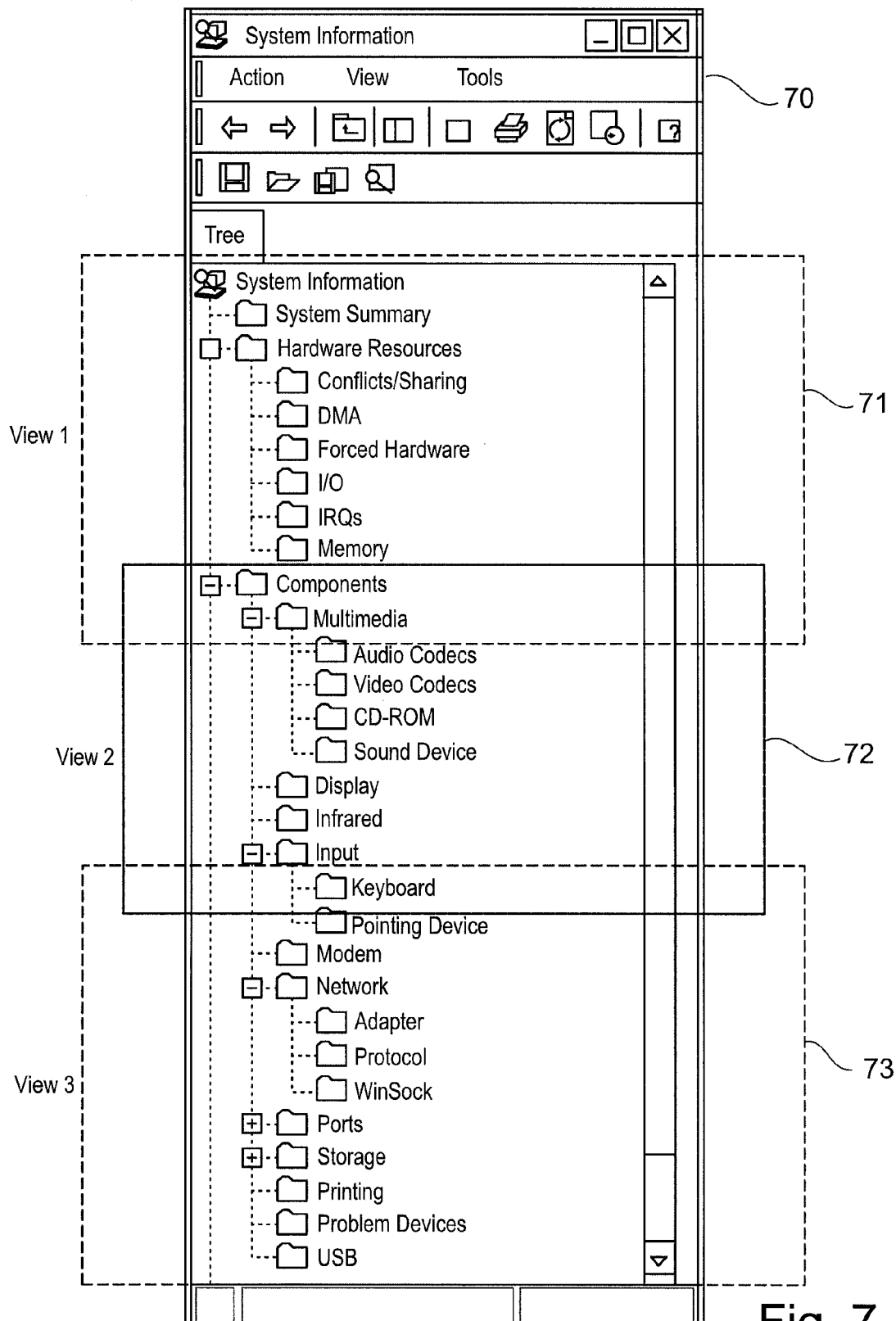
FIG. 7 illustrates how a major view presented on the screen of the equipment under control is mapped into sub-views that fit into the screen size on the remote input device.

FIG. 7 gives one example of a virtual link into a display of an information source according to one embodiment of the invention. Upon connection to the equipment under control (60) the remote unit device (1) display is updated accordingly with a segment of the source information (65, 71). Moving up/down the remote device (1) implies that a virtual scroll is executed on the source information (71, 72, 73). At a certain point in the time, e.g. when looking into a specific segment (72), the user can command, by activation of a button (3), that a synchronization has to take place which implies that the addressed segment (72) becomes the new fix point for further navigation.

Figure 8:
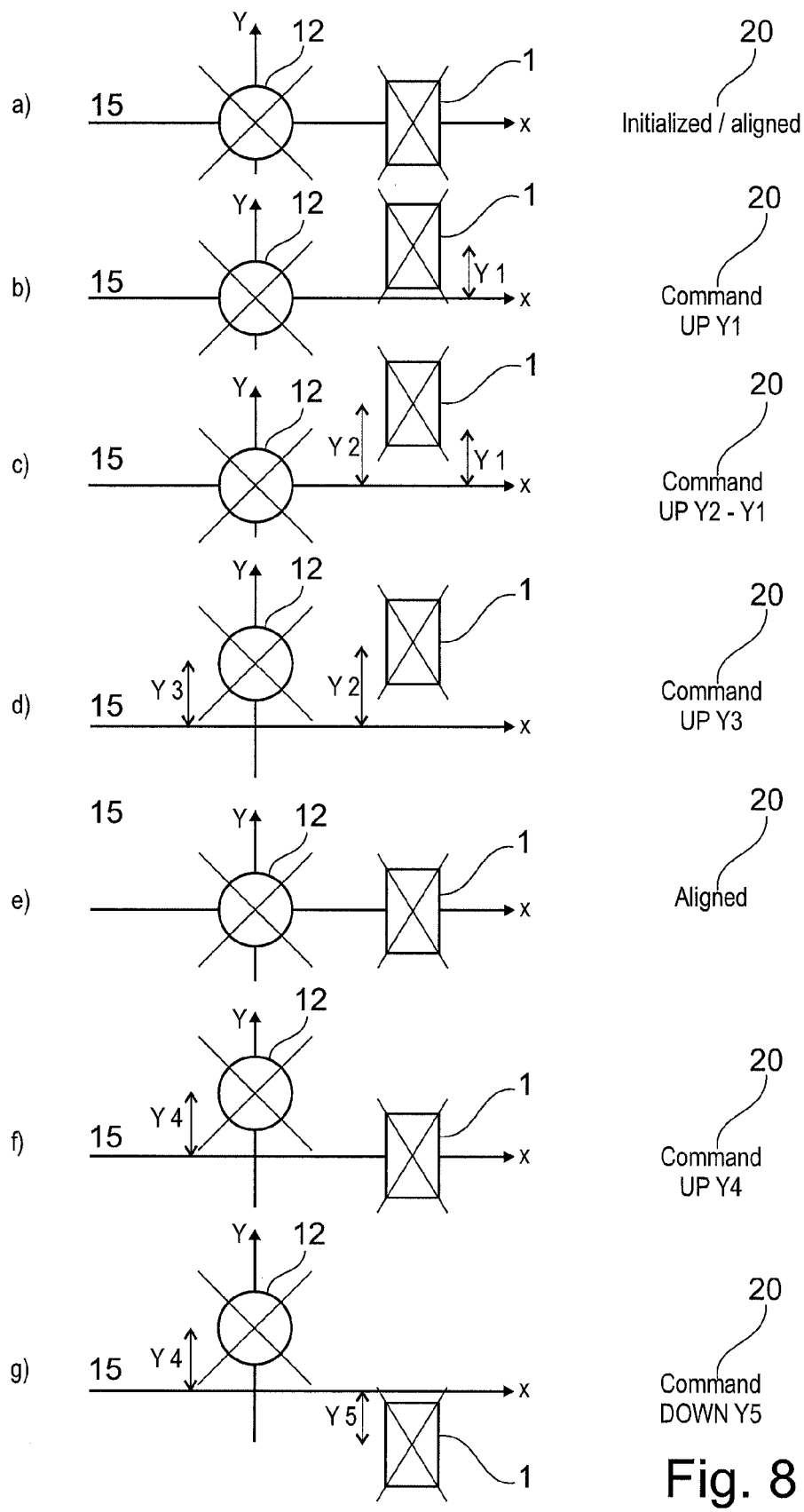
FIG. 8 illustrates how a movement of either the object or the input device, or both, is converted into relative movement command information.

FIG. 8 gives one example of the relative movements of objects according to one embodiment of the invention. The example displays movements in two dimensions X, Y, but the referred method applies for the third dimension Z as well. The remote input device (1) and the object (12), that are optically connected, refer to the same coordinate system (15).

Upon initialization, the input device (1) and the object are aligned along one of the axes, e.g. the X-axis (fig. a).

The input device (1) is moved upward which implies a movement relative to the object (12) along the Y-axis (fig. b), and correspondingly a command (20) is transferred to the device under control.

The input device (1) is further moved upward (fig. c) and the relative displacement to be transferred in terms of the command (20) is calculated to be the difference between the new Y-position and the previous Y-position.

The object (12) is moved upward, which implies a movement relative to the input device (1) along the Y-axis (fig. d), and correspondingly a command (20) is transferred to the device under control.

The user activates a button (3) for synchronization, which implies that the object and the remote terminal are aligned (fig. e) in the coordinate system (15).

The object (12) is further moved upward, which implies a movement relative to the input device (1) along the Y-axis (fig. d), and correspondingly a command (20) is transferred to the device under control. After an alignment the 'previous position' has no influence of the calculation of the relative displacement.

The input device (1) is moved downward, which implies a 'negative' movement relative to the object (12) along the Y-axis (fig. g), and correspondingly a command (20) is transferred to the device under control.

Figure 9:
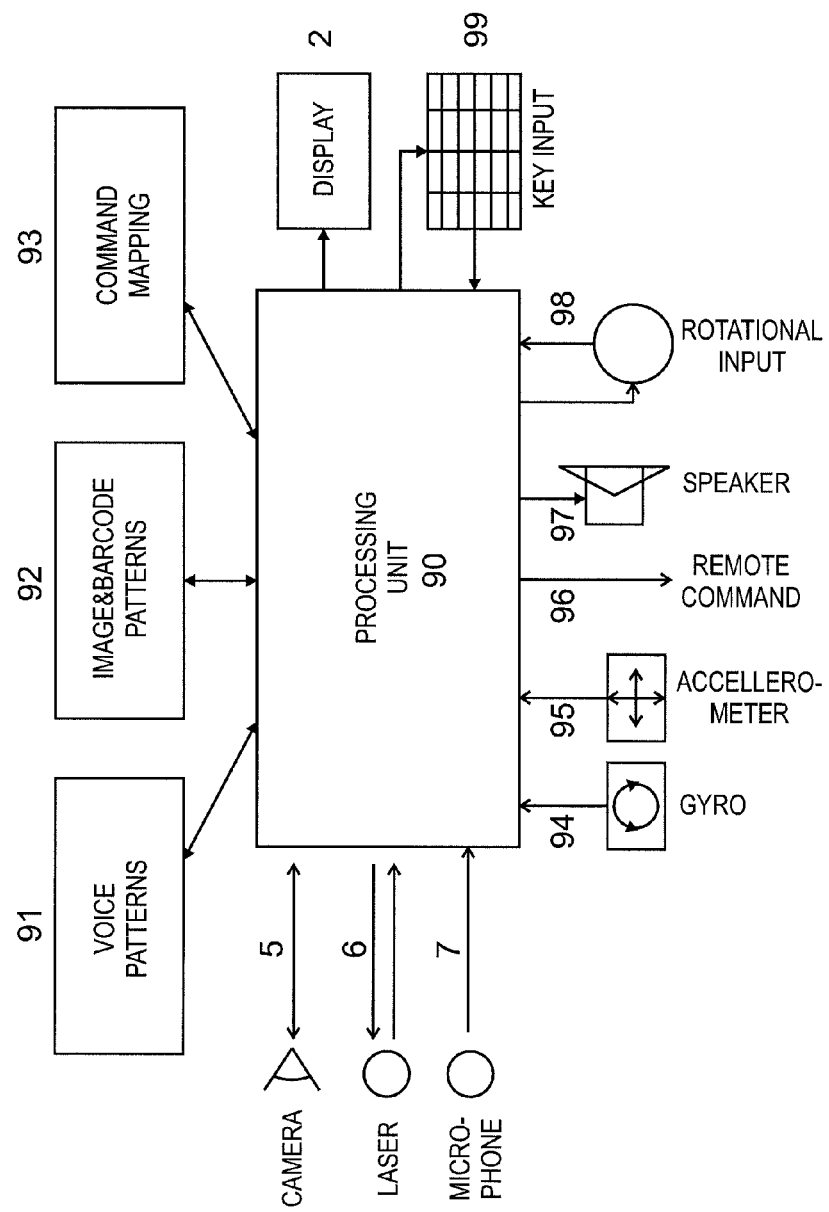
FIG. 9 illustrates a block diagram of a function controller of the remote control device according to one embodiment of the invention.

FIG. 9 gives a block diagram of one example of the controller unit (90) as embedded into the remote control device (1) according to one embodiment of the invention.

Standard and well known principles are applied for sensing user given inputs via strobe keys-input matrix (99) and rotational detection (98), a driver unit for the display screen (2) and a driver unit for the speaker (97).

Other well known principles are applied for external communication lines.

The external wireless remote link (96) for communication with the equipment under control is based on infrared technology in the preferred embodiment of the invention.

Other well known principles are applied for the optical link communication lines, the camera (5) and the image pattern recognition (6).

The object detection and the image pattern detection and processing are encoded by reference image-, and barcode patterns accessible from a table (92).

The movements detected by the remote input device are input to the calculation of the relative movement command to be issued from the terminal. This command is the result of the calculation and the mapping of reference information accessible from a table (93).

Other well known principles are applied for the voice link communication line, where a microphone (7) is an active unit.

The voice detection and processing is encoded by reference voice patterns accessible from a table (91).

Figure 10:
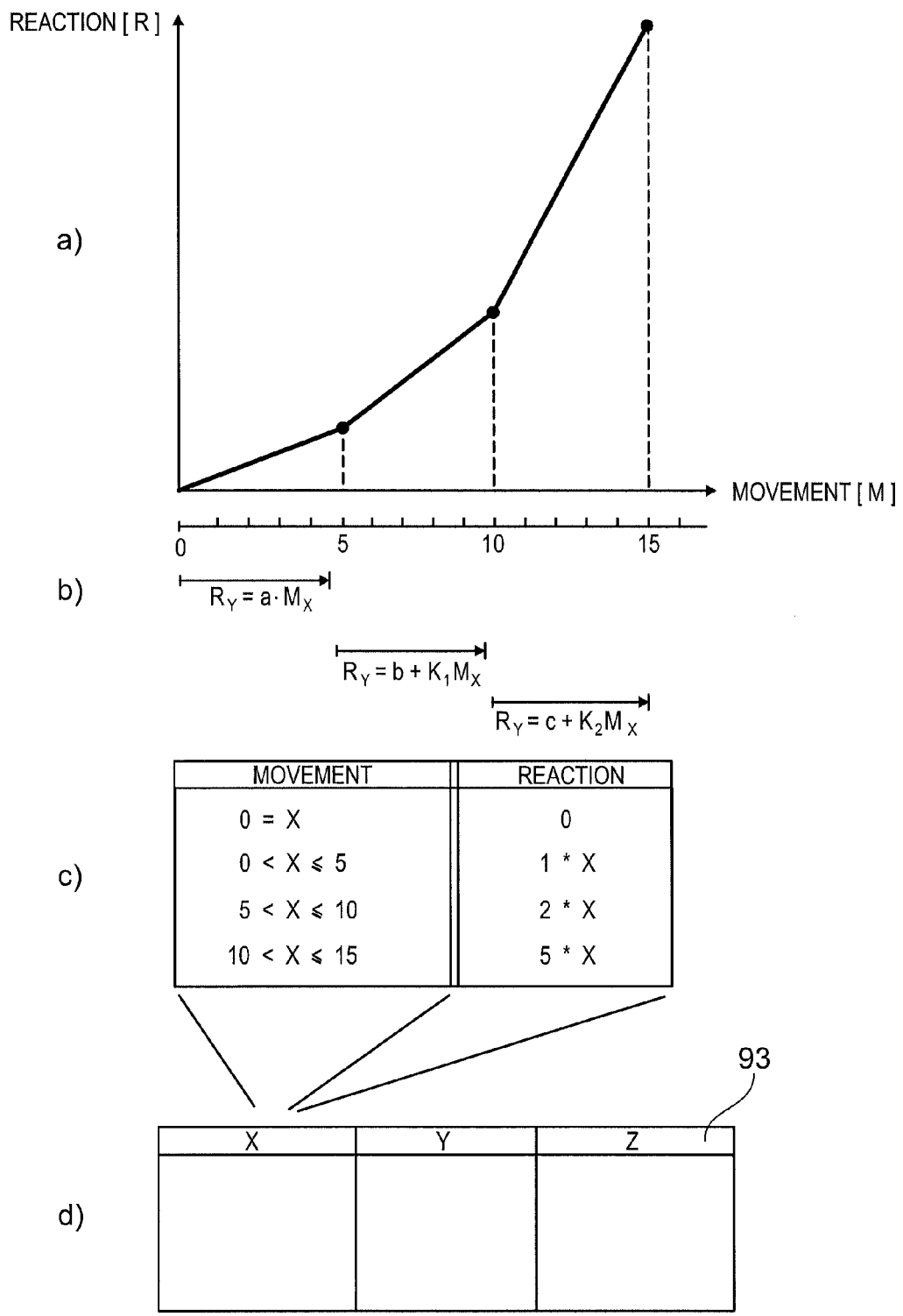
FIG. 10 illustrates an example of how linear movements along the X, Y, and Z axes might be scaled/geared, according to one embodiment of the invention.

FIG. 10 gives one example of accelerated moving along the axes according to one embodiment of the invention. The detected movements along the X, Y, Z axes might be commanded directly to the equipment under control, or scaled in a plurality of modes like: exponential, linear incremental, multiplication factor etc. In a preferred embodiment of the invention, the method used is the piecewise linear calculation (fig. a) where the incremental factor is based on the slope of each of the curves according to the standard formula (fig. b).

In the preferred embodiment of the invention command tables (93) holds the conversion factors for each of the X, Y and Z axes (fig. d), having the offset and slope factors defined in the tables (fig. c).

Figure 11:
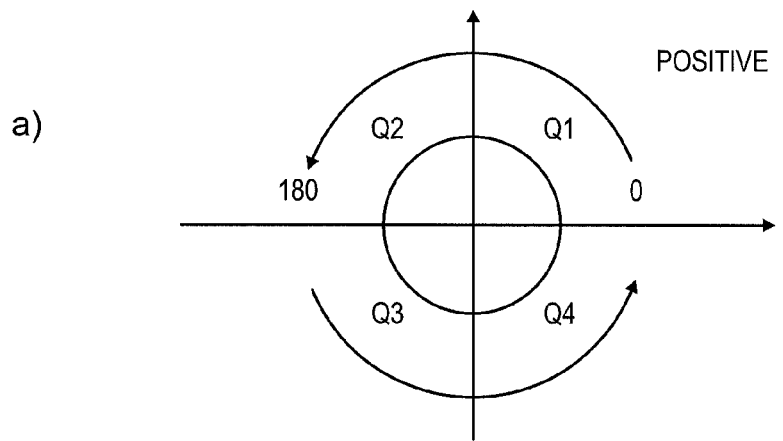
FIG. 11 illustrates an example of how rotational movements might be scaled/geared, according to one embodiment of the invention.
Figure 11:
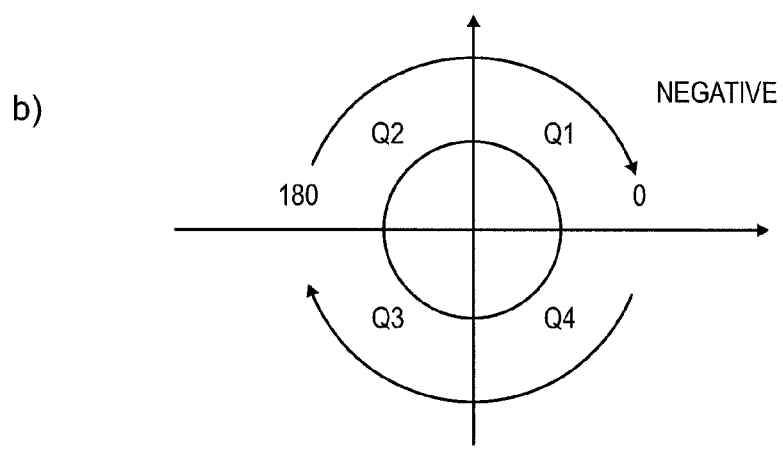
Figure 11:
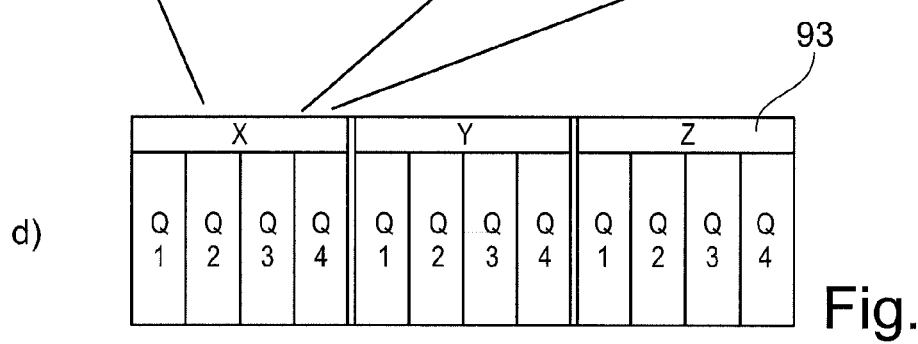

FIG. 11 gives one example of accelerated rotational movements in the 3-dimensional space according to one embodiment of the invention. The detected movements around the X, Y, Z planes might be commanded directly to the equipment under control, or scaled in a plurality of modes like: exponential, linear incremental, multiplication factor etc. In a preferred embodiment of the invention the method used is the angle of rotation related within each quadrant and counted positive (fig. a) or negative (fig. b) according to the direction of rotation.

In the preferred embodiment of the invention command tables (93) holds the conversion factors for each of the rotations per quadrant in the X, Y and Z axes (fig. d), having the offset and degree factors defined in the tables (fig. c).

The invention claimed is:

1. An assembly including an apparatus and a portable unit configured to output control information to the apparatus to control the apparatus, the portable unit comprising:
    a user interface configured to exchange information between the portable unit and a user, the user interface being on a surface of the portable unit,
    an image providing element configured to provide an image at least in a direction perpendicular to the surface of the portable unit and away from the user interface,
    a determining circuit configured to determine, based on at least one image provided by the image providing element, a relative movement between the portable unit and at least one item imaged by the image providing element and configured to output the control information on the basis of the determined relative movement,
    a first output circuit configured to output the control information to the apparatus and configured to receive information from the apparatus, and
    a control circuit configured to control the user interface based on the information received from the apparatus,
        wherein the user interface includes a display that provides the information received from the apparatus to the user and the image providing element is positioned on the portable unit such that the image providing element images the user and images at least one location from which the information provided by the display is discerned by the user, and
    the apparatus including:
    a display configured to provide visual information,
    a receiving circuit configured to receive the control information from the portable unit, the apparatus being configured to be controlled according to the received control information, and
    a second output circuit configured to output at least a portion of the visual information to the portable unit as the information from the apparatus.

2. The assembly according to claim 1, wherein the portable unit is configured to mirror said at least a portion of the visual information displayed on the apparatus.

3. The assembly according to claim 2, wherein said at least a portion of the visual information displayed on the apparatus and displayed on the user interface relates to a size of the apparatus and a size of the user interface.

4. The assembly according to claim 1, wherein the determining circuit is further configured to control the display based on the information displayed.

5. The assembly according to claim 1, further comprising:
a storage device configured to store information relating to at least a two-dimensional element or image that is displayed on the user interface,
the determining circuit further configured to determine, on the basis of the determined relative movement, a change in at least one of an angle, a direction, and a position of viewing the element or image.

6. The assembly according to claim 1, further comprising:
at least one of a gyro unit, a microphone, an accelerometer, a button, and a distance determining unit, wherein the determining circuit is further configured to determine the output information on the basis of information received from the at least one of the gyro unit, the microphone, the accelerometer, the button, and distance determining unit.

7. The assembly according to claim 1, wherein the image providing element is positioned at least one of at, on and in the surface of the portable unit.

8. The assembly according to claim 1, the portable unit, further comprising:
a user-operable button having two modes,
a first mode in which the determining circuit provides the control information on the basis of the determined relative movement, and
a second mode in which the determining circuit does not provide the control information on the basis of the determined relative movement.

9. The assembly according to claim 1, wherein the apparatus is configured to provide the user with at least one of visual information, via the display, and audio information, the apparatus being configured to alter the visual information or the audio information in accordance with control information received from the portable unit.

* * * * *